United States Patent [19]

Kurata

[11] 4,392,144
[45] Jul. 5, 1983

[54] RECORDING UNIT

[75] Inventor: Hisao Kurata, Toyohashi, Japan

[73] Assignee: Keisuke Honda, Aichi, Japan

[21] Appl. No.: 337,946

[22] Filed: Jan. 7, 1982

[30] Foreign Application Priority Data

Jul. 1, 1981 [JP] Japan .............................. 56-98362[U]

[51] Int. Cl.$^3$ ........................................... G01D 15/06
[52] U.S. Cl. ................................................ 346/139 C
[58] Field of Search ........... 346/139 C, 139 A, 139 B, 346/165

[56] References Cited

U.S. PATENT DOCUMENTS 2,627,448  2/1953  Horton ............................ 346/139 A
2,633,405  3/1953  Nelson ............................. 346/139 C
3,392,404  7/1968  Ross ................................ 346/139 C
3,665,965  1/1972  Blackman ....................... 346/139 A Primary Examiner—Joseph W. Hartary
Attorney, Agent, or Firm—Burgess, Ryan and Wayne

[57] ABSTRACT

A recording unit is disclosed which comprises a single hard wire member bent in the form of a coil, one end of which is a recording or current collecting end and the other end of which is a hook end. The coil support of an adapter supports the coil portion of the wire member. The hook end is hooked on one of the hook end supports of the arms extending from the adapter. The recording needle and the current needle are placed on their respective supports.

2 Claims, 3 Drawing Figures

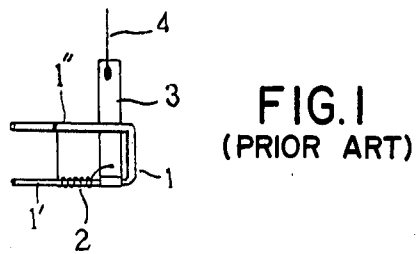
FIG. I
(PRIOR ART)
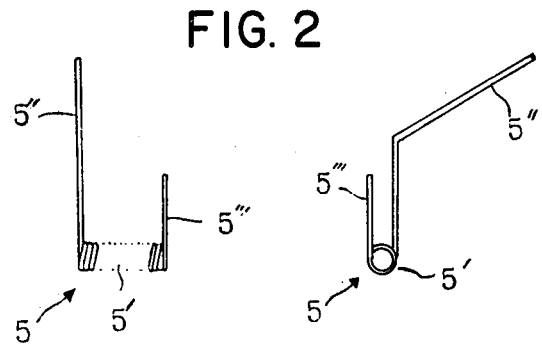
FIG. 2
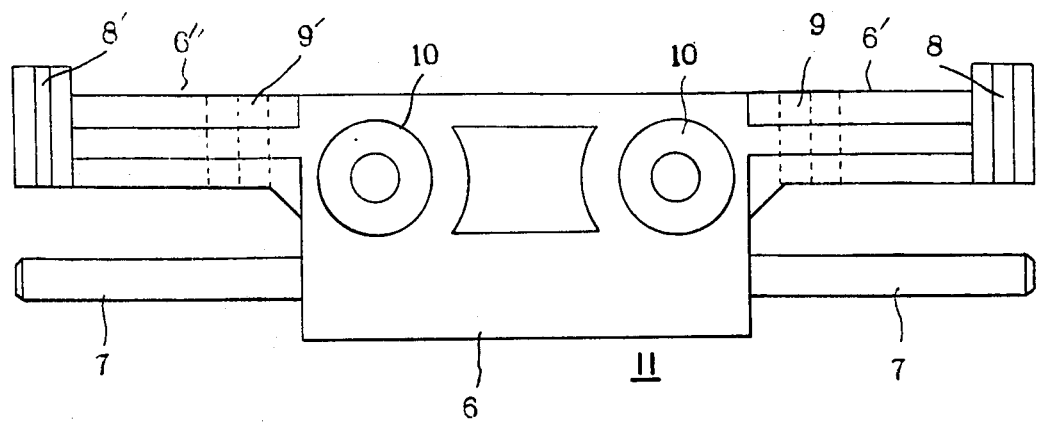
FIG. 3
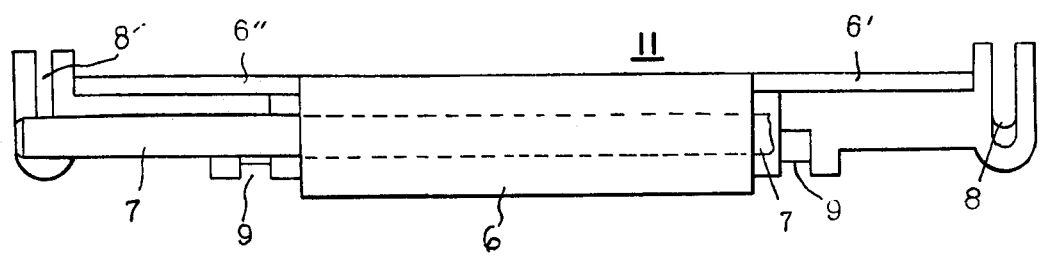

RECORDING UNIT

BACKGROUND OF THE INVENTION

The present invention relates to a recording unit used for fish sonars or the like and is provided with a recording needle which is simple in construction.

The conventional recording unit of this type has a support pivotally mounted on an arm made of a bent wire and a short recording needle is soldered to the support. A spring is mounted to the arm to urge this recording needle against a recording paper. One end of the spring is soldered to the arm and the other end is soldered to the support. A special adapter is required for securely fixing this arm to a belt, and a current collector similar to the recording unit is necessary to transmit recording signals to the recording needle, so that such a system is very complicated in structure and the manufacturing process is time-consuming.

SUMMARY OF THE INVENTION

It is, therefore, an object of the present invention to provide a recording unit with a recording needle and an adapter which are simple in construction.

It is another object of the present invention to provide a recording unit in which the recording needle itself functions as a spring.

It is a further object of the present invention to provide a recording unit in which the recording needle and a current collecting needle are rendered conductive upon mounting thereof.

The recording unit according to the present invention comprises an adapter having an adapter body provided with supports at the ends of arms projecting from both sides of the adapter body and with hook end supports disposed at the bases of the arms, and a coil support secured to the adapter body in parallel with the arms; and a recording or current collecting needle made of a single hard wire member and formed with a coil through which the coil support extends, one end of the wire member being supported by one of the supports to act as a recording or current collecting needle and the other end thereof being a hook end which is hooked on one of the hook end supports.

BRIEF DESCRIPTION OF THE DRAWINGS

FIG. 1 is a rear view of a conventional recording unit;

FIG. 2 shows a front view and a side view of a recording unit according to one embodiment of the present invention; and FIG. 3 shows a plan view and a front view of an adapter to which the recording needle according to the present invention is attached.

DESCRIPTION OF THE PREFERRED EMBODIMENTS

A conventional recording unit used for fish sonars is constructed as shown in FIG. 1, which is a rear view of one such recording unit. In FIG. 1, reference numeral 1 designates a recording needle holder formed by a bent wire; 2, a spring mounted to the arm 1' of the recording needle holder 1; 3, a support pivotally supported by the arm 1' of the recording needle holder 1; and 4, a recording needle secured to the front end of the support 3 with solder or the like. One end of the spring 2 is secured to the arm 1" of the recording needle holder 1 and the other end thereof is secured to the support 3. The support 3 is urged against the arm 1" of the recording needle holder 1 by the spring 2.

In the conventional recording unit of the structure described above, the recording needle 4 is fixed to the support 3 with solder or the like and the support 3 is pivotally mounted on the arm 1' of the recording needle holder 1. One end of the spring 2 is secured to the arm 1" of the recording needle holder 1 with solder or the like, and the other end thereof is fixed to the support 3. Thus, this recording unit has many components and the manufacturing process is highly time-consuming. Another defect of this unit is that the construction of an adapter for detachably fitting the recording unit to a belt is very complicated.

FIG. 2 shows a front view and a side view of a recording or current collecting needle according to one embodiment of the present invention. A hard wire member 5 of, for example, tungsten has a coil 5' formed in the middle portion thereof. One end 5" of this hard wire member 5 acts as a recording or current collecting end and the other end is a hook end 5'''. The recording or current collecting needle of this embodiment thus constructed is advantageous in that it is very simple in structure and inexpensive to manufacture.

An adapter 11 to which, the recording or current collecting needle of the construction mentioned above is attached, is shown in FIG. 3. The ends of the arms 6' and 6" extending on both sides of a body 6 are respectively provided with supports 8 and 8'. The base portions of the arms 6' and 6" have hook end supports 9 and 9', respectively. A coil support 7 is fixed through the body 6 in parallel with the arms 6' and 6". In addition, the body 6 is provided with securing holes 10 through which screws or calkings extend for fixing this adapter 11 to a belt.

When the recording end 5" is to be mounted onto the adapter 11 of this structure, the coil support 7 is inserted through the hollow portion of the coil 5' of the hard wire member 5. Then, the hook end 5''' of the hard wire member 5 is hooked on the hook end support 9' of the arm 6". While tension is exerted on the recording end 5", it is placed upon the recording end support 8' of the arm 6". The arm 6' and the coil support 7 are used to mount the current collecting end 5".

The adapter 11 having the recording needle and current collecting needle mounted thereto is secured to the belt through the securing holes 10 by screws or calkings.

What is claimed is:

1. A recording unit comprising an adapter having an adapter body provided with supports at ends of arms projecting from both sides of said adapter body and with hook end supports disposed at the bases of said arms, and a coil support secured to said adapter body in parallel with said arms; and a recording or current collecting needle made of a single hard wire member and formed with a coil through which extends said coil support, one end of said hard wire member being supported by one of said supports of said adapter to act as a recording or current collecting needle and the other end thereof being a hook end which is hooked on one of said hook end supports.

2. A recording unit according to claim 1, wherein said hard wire member is made of tungsten.

* * * * *